United States Patent

[11] 3,568,044

| [72] | Inventor | Shmuel Elazar |
| | | Camarillo, Calif. |
| [21] | Appl. No. | 759,376 |
| [22] | Filed | Sept. 12, 1968 |
| [45] | Patented | Mar. 2, 1971 |
| [73] | Assignee | Bell & Howell Company |
| | | Chicago, Ill. |

[54] LINEARIZING CIRCUIT FOR HIGH OUTPUT TRANSDUCERS
6 Claims, 2 Drawing Figs.

[52] U.S. Cl. ................................................ 323/75, 324/62
[51] Int. Cl. ........................................ G01r 17/10
[50] Field of Search ............................. 323/75 (N); 324/62 (B), 63; 330/69

[56] References Cited
UNITED STATES PATENTS

| 3,503,261 | 3/1970 | Riester et al. | 323/75X(N) |
| 2,771,579 | 11/1956 | Ruge | 324/62 |
| 3,148,339 | 9/1964 | Bell et al. | 330/69 |
| 3,371,708 | 3/1968 | Chaparro | 323/75X(N) |
| 3,377,554 | 4/1968 | Sapoff | 324/62 |

Primary Examiner—J. D. Miller
Assistant Examiner—A. D. Pellinen
Attorney—David Weiss ABSTRACT: A transducer system which employs in combination an impedance bridge circuit with a differential amplifier and includes a feedback circuit to equalize nonlinearity in the components of the impedance bridge.

INVENTOR.
SHMUEL ELAZAR

BY JACKSON & JONES
Attorneys

LINEARIZING CIRCUIT FOR HIGH OUTPUT TRANSDUCERS

BACKGROUND OF THE INVENTION

1. Field of the Invention

This invention relates to transducer systems and more particularly to the combination of a bridge-type transducer and a differential amplifier.

2. Description of the Prior Art

Transducers are useful in systems wherein it is desired to monitor conditions at certain points therein. For example, it may be desired to measure the pressure or temperature at particular points in the system. Such transducers may also be used to measure the stress and strain placed upon particular objects or materials during processing (i.e., strain gauges). It is generally the practice to place a transducer arrangement, which is sensitive to the changes in the conditions being measured, in proximity to the object or point being monitored. Where transducers of the impedance bridge type, e.g., Wheatstone resistance bridges, are employed, the changes appear as changes in the bridge impedance. Such impedance bridges are energized by a suitable source of excitation voltage so that changes in the impedance in the arms of the bridge produce changes in the output voltages.

Ideally, the output from a four-armed fully active bridge (e.g., a strain gauge) is a linear function of bridge stimulation for a constant bridge current. In reality the bridge output is nonlinear in varying degrees due to unequal changes in element resistance with stimulation. If a single active arm bridge is used then the output is nonlinear even in an ideal condition. The present invention provides compensation for the nonlinear response of conventional impedance bridge transducers.

SUMMARY OF THE INVENTION

Briefly described the present invention comprises a transducer system including an impedance bridge in combination with an amplifier for providing a high level output signal which is representative of the bridge unbalance. Means responsive to the output signal is provided to apply a compensation voltage to the bridge to compensate for the nonlinear response of the bridge. A feedback resistor may be connected between the amplifier output and the bridge to apply the compensation voltage to the bridge. The feedback resistor may provide positive or negative feedback depending upon the nonlinearity of the bridge. If a nonlinear response is detected on the bridge output which has a negative going slope then positive feedback is provided and vice versa. The feedback voltage causes the bridge output to change as a function of the output of the amplifier to compensate for the nonlinear output of the bridge.

DESCRIPTION OF ONE PREFERRED EMBODIMENT

Figure 1:
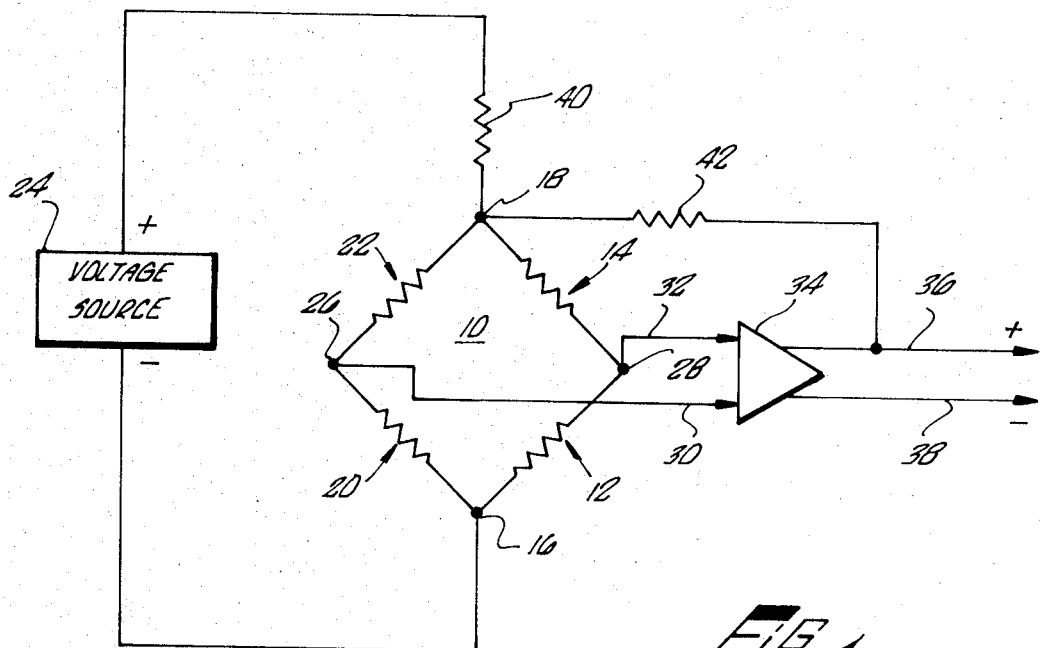
FIG. 1 is a schematic circuit diagram of one preferred embodiment of this invention.

Turning now to a more detailed description of this invention there is shown a preferred embodiment of the transducer system of this invention which includes an impedance bridge network 10. As illustrated the bridge network 10 includes branches 12 and 14 connected in series between input terminals 16 and 18. The bridge 10 also includes branches 20 and 22 also connected in series between the terminals 16 and 18. The bridge 10 is normally balanced in that impedance branches 12 and 14 have an impedance ratio which normally is equal to the impedance ratio of the branches 20 and 22. Accordingly a potential applied between the terminals 16 and 18 from a voltage source 24 normally produces a zero voltage between output terminals 26 and 28 of the bridge network 10. The opposite branches of the bridge type transducer 10 are variable in like sense while the adjacent branches are variable in an opposite sense. Thus, when conditions being monitored by the transducer arrangement vary, the variable bridge element in the branches 14 and 20 vary in the same sense and the variable bridge elements 12 and 22 in the bridge vary in an opposite sense. In this manner a given variation in the conditions being monitored produces a maximum variation in the impedance of the transducer arrangement which causes a substantial unbalancing of the bridge 10. An unbalance of the bridge 10 in turn results in a change in the voltage developed between the terminals 30 and 32 of the amplifier 34.

The amplifier 34 is of the type whose output is representative of the difference between the two potentials applied to the input terminals 30 and 32 thereof. Such an amplifier may be termed a difference type, or differential amplifier. The voltage signal developed between the input terminals 30 and 32 of the differential amplifier in turn produce an output signal between terminals 36 and 38. The amplifier 34 provides an output signal having a polarity opposite to the voltage between the input terminals 32 and 30. Thus, when the input terminal 30 is positive relative to the terminal 32, the output terminal 36 is positive relative to the output terminal 38. A resistor 40 is connected between the bridge terminal 18 and the positive terminal of the voltage source 24 to control the bridge current and therefore the bridge sensitivity.

In accordance with this embodiment of the invention a feedback resistor 42 is connected between the terminals 18 and 36. The feedback resistor 42 supplies a compensation voltage to the bridge network 10 to compensate for the nonlinear output of the bridge 10, as will be explained more fully in reference to FIG. 2.

Figure 2:
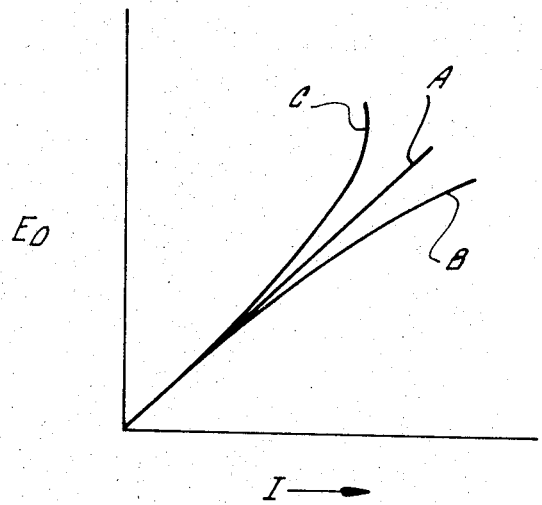
FIG. 2 is a graphic diagram of response curves to illustrate the function of the embodiment shown in FIG. 1.

With a constant current flowing through an ideal bridge the output of amplifier 34 will be a linear function of the bridge 10 stimulation. With a constant excitation voltage the bridge current will remain constant. If, on the other hand, the bridge current is not constant but a function of the bridge stimulation, then the output of the amplifier 34 will not be a linear function of the input since the bridge sensitivity will change as a function of the stimulation. For example, if the bridge current is caused to increase as a function of stimulation, then the bridge sensitivity will increase as a function of stimulation and the output of amplifier 34 will increase in a nonlinear fashion and produce a curve similar to curve C, shown in FIG. 2. The reverse of this will produce a response similar to curve B as shown in FIG. 2. If the technique used to obtain curve C of FIG. 2 for an ideal bridge were employed to compensate the bridge characterized by curve B then the combination thereof would produce a linear curve as illustrated by curve A.

As the bridge is stimulated the positive excursion of the amplifier output terminal 36 causes a current to flow through resistor 42 into the bridge at terminal 18 which increases as the stimulation increases. Thus, in the manner described, the response of the ideal system is caused to be nonlinear similar to the curve C of FIG. 2 and combined with the nonlinear characteristics of the real bridge to produce an overall linear response. The value of the resistor 42 is determined by the degree of nonlinearity required for the correction.

If the nonlinear characteristics of the bridge were similar to the curve C shown in FIG. 2 then resistor 42 would be connected between terminal 18 and the negative output terminal 38 of the amplifier.

Having described one preferred embodiment of this invention, it is contemplated that modifications and alterations can be made without departing from the spirit and scope of this invention.

I claim:

1. In a transducer system in which a bridge is energized by a source of excitation voltage, the combination comprising:

an impedance bridge network having a pair of excitation input terminals adapted to be connected to the source of excitation voltage, the bridge network including at least one active bridge element and being arranged to produce an output representative of the bridge unbalance in response to applied stimulation;

an amplifier coupled to the bridge network for producing an output signal representative of the bridge output; and means responsive to the output signal of the amplifier for applying a voltage to the bridge network to compensate for nonlinear response of the active bridge elements to applied stimulation.

2. The transducer system as defined in claim 1 wherein said changes the magnitude of the excitation voltage applied to the bridge network.

3. The transducer system as defined in claim 2 wherein said amplifier is a differential amplifier and said means includes a feedback resistance coupled between the amplifier and one of the input terminals of the bridge network.

4. The transducer system as defined in claim 3 further including a resistance connected between the source of excitation voltage and said one input terminal of the bridge network.

5. A transducer system comprising:

a voltage source;

a bridge network including a first pair of resistors and a second pair of resistors, at least one of said resistors being variable in response to applied stimulation;

first and second terminals;

means for connecting the first pair of resistors in series between the first and second terminals, and means for connecting the second pair of resistors in series between the first and second terminals;

means for connecting the voltage source across the first and second terminals;

a differential amplifier having a pair of input and a pair of output terminals;

means for connecting one of the amplifier input terminals to the junction of the first pair of resistors;

means for connecting the other amplifier input terminal to the junction of the second pair of resistors; and feedback means for reducing nonlinearity of the variable resistor response to applied stimulation, connected between one of the outputs of the differential amplifier and the first terminal of the bridge network.

6. The transducer as defined in claim 5 wherein the means for connecting the voltage source across the first and second terminals includes a resistor connected between the first terminal of the bridge network and one of the output circuits of said voltage source.

UNITED STATES PATENT OFFICE
CERTIFICATE OF CORRECTION

Patent No. 3,568,044      Dated March 2, 1971

Inventor(s) Shmuel Elazar

It is certified that error appears in the above-identified paten and that said Letters Patent are hereby corrected as shown below:

In the claims, column 3, line 11, after "said" insert --means--

Signed and sealed this 13th day of July 1971.

(SEAL)
Attest:

EDWARD M. FLETCHER, JR.
Attesting Officer

WILLIAM E. SCHUYLER, JR
Commissioner of Patents